(12) United States Patent
Nakata (10) Patent No.: US 8,385,834 B2
(45) Date of Patent: Feb. 26, 2013

(54) RADIO RECEIVING APPARATUS AND NOISE ELIMINATION METHOD IN THE SAME APPARATUS

(75) Inventor: Kazuhiro Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 329 days.

(21) Appl. No.: 12/596,288

(22) PCT Filed: Apr. 2, 2008

(86) PCT No.: PCT/JP2008/000849
§ 371 (c)(1),
(2), (4) Date: Oct. 16, 2009

(87) PCT Pub. No.: WO2009/008114
PCT Pub. Date: Jan. 15, 2009

(65) Prior Publication Data
US 2010/0112970 A1    May 6, 2010

(30) Foreign Application Priority Data
Jul. 9, 2007    (JP) ................. 2007-180011

(51) Int. Cl.
*H04B 1/00*    (2006.01)
*H04B 15/00*    (2006.01)
*H04B 17/00*    (2006.01)
*H04B 1/10*    (2006.01)

(52) U.S. Cl. ................. 455/67.11; 455/63.1; 455/67.13; 455/222; 455/296; 375/254; 375/346

(58) Field of Classification Search ............. 455/63.1, 455/67.11, 67.13, 296, 210–211, 222–224, 455/283–285, 295, 226.1, 226.3; 375/144, 375/148, 254, 346
See application file for complete search history.

(56) References Cited

U.S. PATENT DOCUMENTS

| | | | | |
|---|---|---|---|---|
| 3,700,812 | A * | 10/1972 | Springett | 381/94.8 |
| 5,630,217 | A * | 5/1997 | Matsumoto | 455/222 |
| 6,725,027 | B1* | 4/2004 | Tsuji et al. | 455/296 |
| 6,795,559 | B1* | 9/2004 | Taura et al. | 381/94.8 |
| 6,826,392 | B2* | 11/2004 | Tsuji et al. | 455/296 |
| 7,366,264 | B2* | 4/2008 | Henriksson | 375/346 |
| 7,590,399 | B2* | 9/2009 | Shatara et al. | 455/272 |
| 7,643,538 | B2* | 1/2010 | Currivan et al. | 375/144 |
| 7,689,192 | B2* | 3/2010 | Saito | 455/296 |
| 7,756,501 | B2* | 7/2010 | Saito et al. | 455/303 |
| 7,835,477 | B2* | 11/2010 | Suzuki | 375/346 |
| 2003/0043942 | A1* | 3/2003 | Ono | 375/347 |
| 2004/0071363 | A1* | 4/2004 | Kouri et al. | 382/276 |
| 2005/0143109 | A1 | 6/2005 | Ohashi | |
| 2005/0153674 | A1* | 7/2005 | Suganuma | 455/296 |

(Continued)

FOREIGN PATENT DOCUMENTS

| | | |
|---|---|---|
| EP | 1180851 A2 | 2/2002 |
| JP | 59-165549 A | 9/1984 |

(Continued)

*Primary Examiner* — Simon Nguyen
(74) *Attorney, Agent, or Firm* — Birch, Stewart, Kolasch & Birch, LLP (57) ABSTRACT

A control section 8 detects the symmetry of an input pulse-like noise waveform with respect to a reference value from its Fourier spectrum distribution, and restricts, in the case of a symmetric wave, the operation of a noise elimination circuit such as a noise killer circuit 7, which performs previous value hold or various interpolation processing.

4 Claims, 5 Drawing Sheets

U.S. PATENT DOCUMENTS

| | | | |
|---|---|---|---|
| 2005/0164722 A1* | 7/2005 | Akiyama | 455/501 |
| 2006/0078044 A1* | 4/2006 | Norrell et al. | 375/222 |
| 2006/0116095 A1* | 6/2006 | Henriksson | 455/223 |
| 2007/0014334 A1 | 1/2007 | Currivan et al. | |
| 2008/0077403 A1* | 3/2008 | Hayakawa | 704/233 |
| 2008/0200127 A1* | 8/2008 | Hamman | 455/63.1 |
| 2008/0232440 A1* | 9/2008 | Yousef et al. | 375/148 |

FOREIGN PATENT DOCUMENTS

| | | |
|---|---|---|
| JP | 10-200492 A | 7/1998 |
| JP | 2001-36422 A | 2/2001 |
| JP | 2005-197813 A | 7/2005 |
| JP | 2006-67334 A | 3/2006 |
| JP | 2006-319815 A | 11/2006 |

\* cited by examiner

RADIO RECEIVING APPARATUS AND NOISE ELIMINATION METHOD IN THE SAME APPARATUS

TECHNICAL FIELD

The present invention relates to a radio receiving apparatus and a noise elimination method in the same apparatus, having a noise elimination circuit for eliminating a pulse-like noise component from a radio input audio signal.

BACKGROUND ART

A noise killer circuit (also referred to as "noise canceler") has been known which eliminates a pulse-like noise signal component from a radio input audio signal by previous value hold or interpolation processing. However, the noise killer circuit can sometimes add rasping burst noise when operating too much.

To solve the problem, a noise elimination method has conventionally been proposed which detects the symmetry of an input data waveform based on a certain threshold, and controls, when detecting an asymmetric waveform, in such a manner as to prevent the output of the data (see Patent Document 1, for example).

Patent Document 1: Japanese Patent Laid-Open No. 59-165549.

However, according to the noise elimination method disclosed in the foregoing Patent Document 1, it can detect only a symmetric waveform synchronized with a reference sampling period, and cannot detect the symmetry unless the value during the sampling is constant. Thus, it is unsuitable for detecting a pulse-like waveform.

Accordingly, some possibility cannot be denied that the noise elimination circuit included in the radio receiving apparatus can generate a signal waveform slightly different from its original form for the pulse-like radio input audio signal waveform, and add as the rasping burst noise.

The present invention is implemented to solve the foregoing problem. Therefore it is an object of the present invention to provide a radio receiving apparatus and a noise elimination method in the same apparatus capable of achieving appropriate control of a noise elimination circuit that is likely to generate a signal waveform different from the original form and to add it as noise by limiting the operation of the noise elimination circuit depending on the radio input audio signal waveform.

DISCLOSURE OF THE INVENTION

To solve the foregoing problems, a radio receiving apparatus in accordance with the present invention is a radio receiving apparatus having a noise elimination circuit for removing a pulse-like noise component of a radio input audio signal, and including a control section for making a decision of waveform symmetry with respect to a reference value of the pulse-like noise component from Fourier spectrum distribution, and for restricting operation of the noise elimination circuit when a decision of a symmetric wave is made.

In addition, a noise elimination method in a radio receiving apparatus in accordance with the present invention includes: a step of sampling a pulse-like noise component of a radio input audio signal only by a length of a detection frame period; a step of calculating relative amplitude values of respective harmonics by performing Fourier series expansion of the pulse-like noise component with the length of the detection frame period; a step of calculating a differential coefficient with respect to a frequency axis from the relative amplitude values of the respective harmonics; and a step of comparing the calculated differential coefficient with a reference value in a comparatively low frequency region, of making, when a decision is made that the differential coefficient is smaller than the reference value, a decision that the pulse-like noise component has an asymmetric waveform, thereby enabling noise elimination operation by the noise elimination circuit, and of making, when a decision is made that the differential coefficient is greater than the reference value, a decision that the pulse-like noise has a symmetric waveform, thereby restricting the operation of the noise elimination circuit.

According to the present invention, it can provide a radio receiving apparatus and a noise elimination method in the same apparatus capable of achieving appropriate control of the noise elimination circuit, which has a probability of generating a signal waveform different from the original form and adding as noise, by restricting the operation of the noise elimination circuit depending on the radio input signal waveform.

BEST MODE FOR CARRYING OUT THE INVENTION

The best mode for carrying out the invention will now be described with reference to the accompanying drawings to explain the present invention in more detail.

FIG. 1-FIG. 4 are graphs shown for explaining relationships between waveform symmetry and a Fourier spectrum. Here, the explanation relates to the reception of a radio audio signal, and let us consider the symmetry and Fourier spectrum of pulse-like noise (burst tone) that will have adverse effect on aural feeling.

Figure 1:
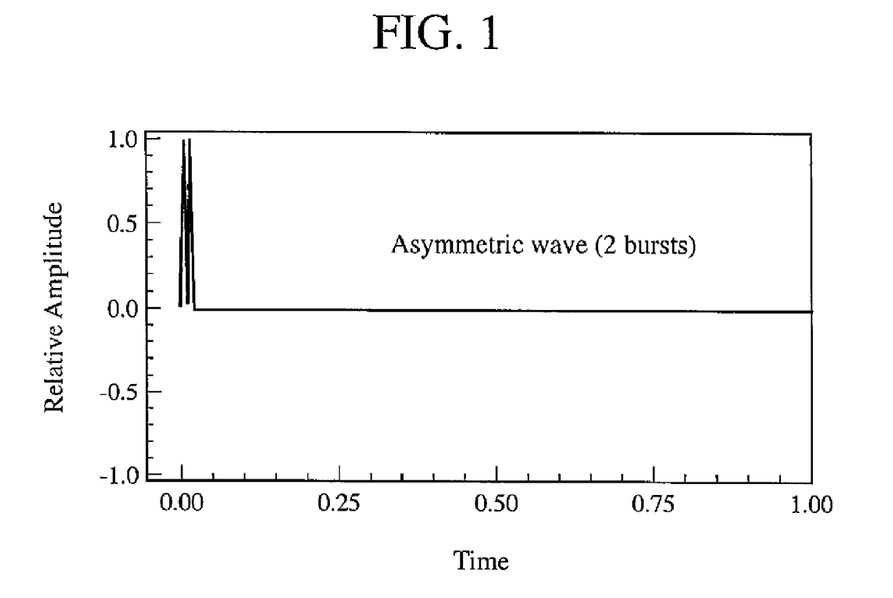
FIG. 1 is a graph shown for explaining relationships between waveform symmetry and a Fourier spectrum.
Figure 2:
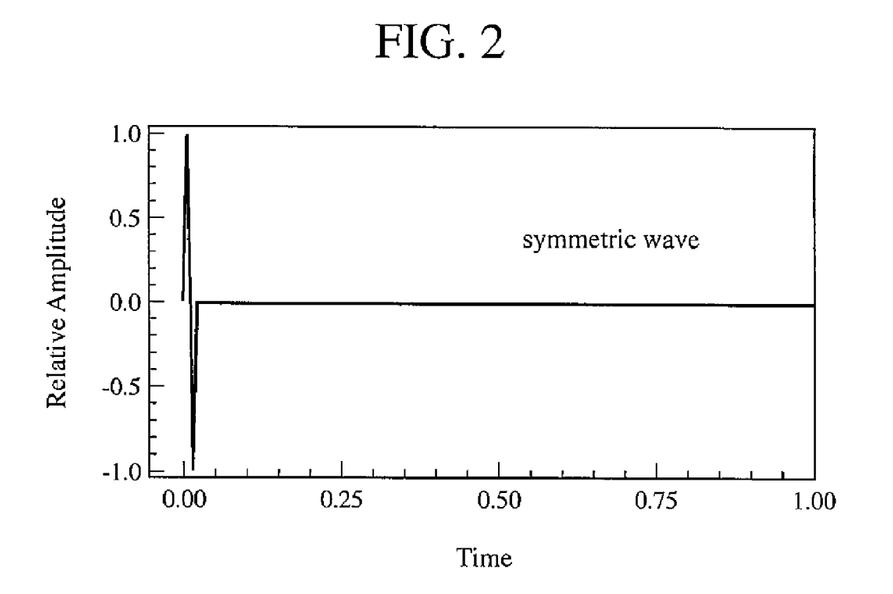
FIG. 2 is a graph shown for explaining relationships between waveform symmetry and a Fourier spectrum.

FIG. 1 and FIG. 2 show, under the assumption that a detection frame period is 1, continuous two burst waves (asymmetric wave (2 bursts)) with a half period of a sinusoidal wave whose period is 1/50 of the detection frame period, and a waveform of a burst wave (symmetric wave) with a period of the sinusoidal wave, respectively. In both FIG. 1 and FIG. 2, the vertical axis shows relative amplitude (Relative Amplitude), and the horizontal axis shows a time axis (Time).

Figure 3:
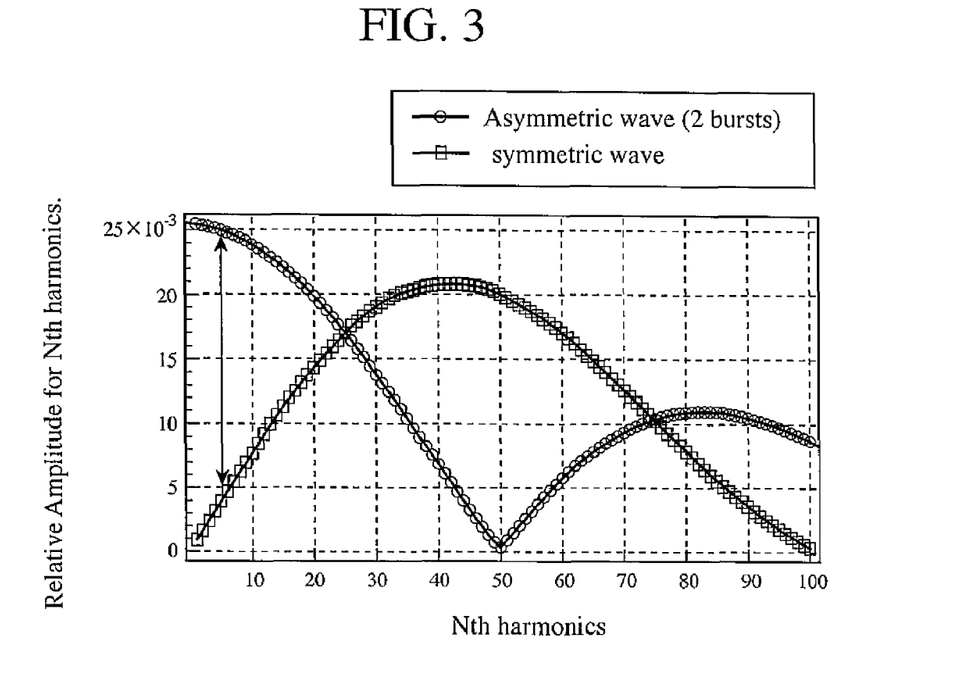
FIG. 3 is a graph shown for explaining relationships between the waveform symmetry and Fourier spectra.

As is obvious in the graphs of FIG. 1 and FIG. 2, although both the symmetric wave and asymmetric wave have the same effective value (relative amplitude), their Fourier series expansions will give coefficient distribution (Fourier spectrum distribution) of harmonics as shown in FIG. 3.

As is obvious from FIG. 3, as for the coefficient distribution of the harmonics, the asymmetric wave has its energy leaned toward low frequencies as compared with the symmetric wave. Here, in FIG. 3 the symmetric wave is plotted by □ and the asymmetric wave by ○ continuously.

Here, since the higher degree harmonic components are removed with a low-pass filter that rejects signals outside the audible range, although they do not present any problem for aural feeling, the low degree harmonic components have an effect. Accordingly, when the pulse-like noise component (burst waves) of the asymmetric radio input audio signal are input, the noise elimination circuit must remove the burst waves. However, the symmetric burst wave offers little problem for the aural feeling even without adding any particular processing.

Figure 4:
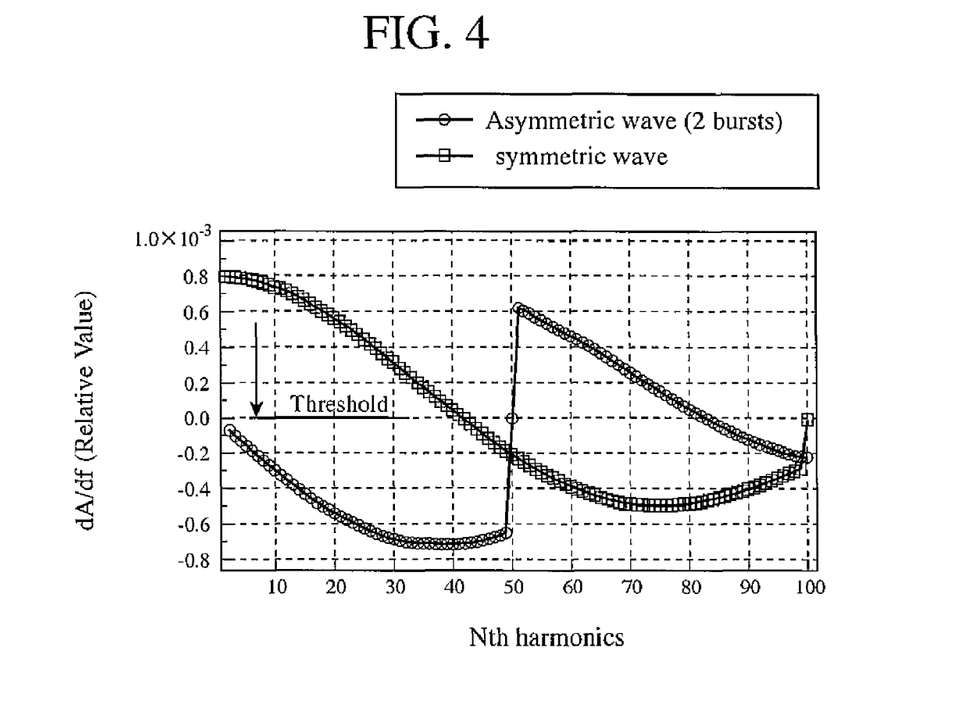
FIG. 4 is a graph shown for explaining relationships between the waveform symmetry and the Fourier spectra.

In view of this, differentiating the magnitude of the coefficients of the individual harmonics with respect to the frequency axis (horizontal axis) (dA/df), the resulting waveforms become as shown in the graph of FIG. 4. In this way, a decision can be made that if it has a positive differential coefficient in a low frequency region (50th-order harmonics or less in the example), it is a symmetric wave or close to it. Incidentally, in FIG. 3 and FIG. 4, the horizontal axis shows Nth harmonics, and the vertical axis of FIG. 3 shows relative amplitude (Relative Amplitude for Nth harmonic), and that of FIG. 4 shows differential values (dA/df).

Embodiment 1

While supposing the foregoing relationships between the waveform symmetry and the Fourier spectra, a configuration and operation of the radio receiving apparatus of an embodiment 1 in accordance with the present invention will now be described in detail with reference to from FIG. 5 onward.

Figure 5:
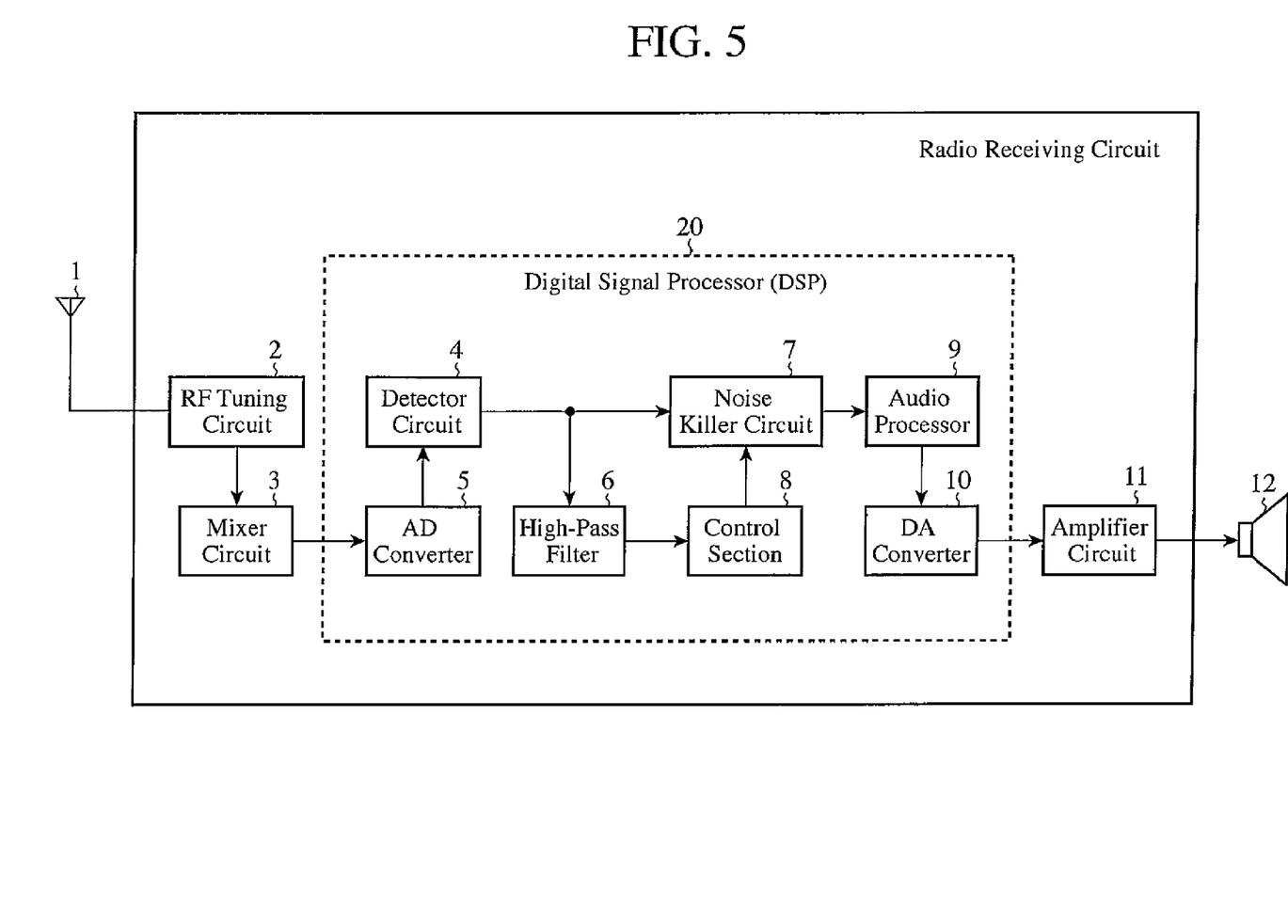
FIG. 5 is a block diagram showing an internal configuration of a radio receiving apparatus of an embodiment 1 in accordance with the present invention.

As shown in FIG. 5, for example, the radio receiving apparatus comprises a radio antenna 1, an RF (Radio Frequency) tuning circuit 2, a mixer circuit 3, a detector circuit 4, an AD (Analog-Digital) converter 5, a high-pass filter 6, a noise killer circuit 7, a control section 8, an audio processor 9, a DA (Digital-Analog) converter 10, and an amplifier circuit 11.

Incidentally, as for the detector circuit 4, AD converter 5, high-pass filter 6, noise killer circuit 7, control section 8, audio processor 9, and DA converter 10, a digital signal processor (DSP) 20 is usually used to form them.

In the foregoing configuration, broadcast signals received via the radio antenna 1 undergo tuning to a broadcasting station a user desires through the RF tuning circuit 2, and is converted to an intermediate frequency (IF) with the mixer circuit 3. The AD converter 5 converts the intermediate frequency component output from the mixer circuit 3 to a digital signal for processing by the DSP 20, and supplies it to the detector circuit 4.

The detector circuit 4 generates an audio signal from the intermediate frequency component, which has been converted to the digital signal through the AD converter 5 and is input, and supplies it to the noise killer circuit 7 and high-pass filter 6. The noise killer circuit 7 is a noise elimination circuit for eliminating noise through the previous value hold and interpolation processing, and the noise removed audio signal is supplied to the audio processor 9. In addition, the high-pass filter 6 is a high-pass filter that passes only pulse-like noise, and its output is supplied to the control section 8.

Figure 6:
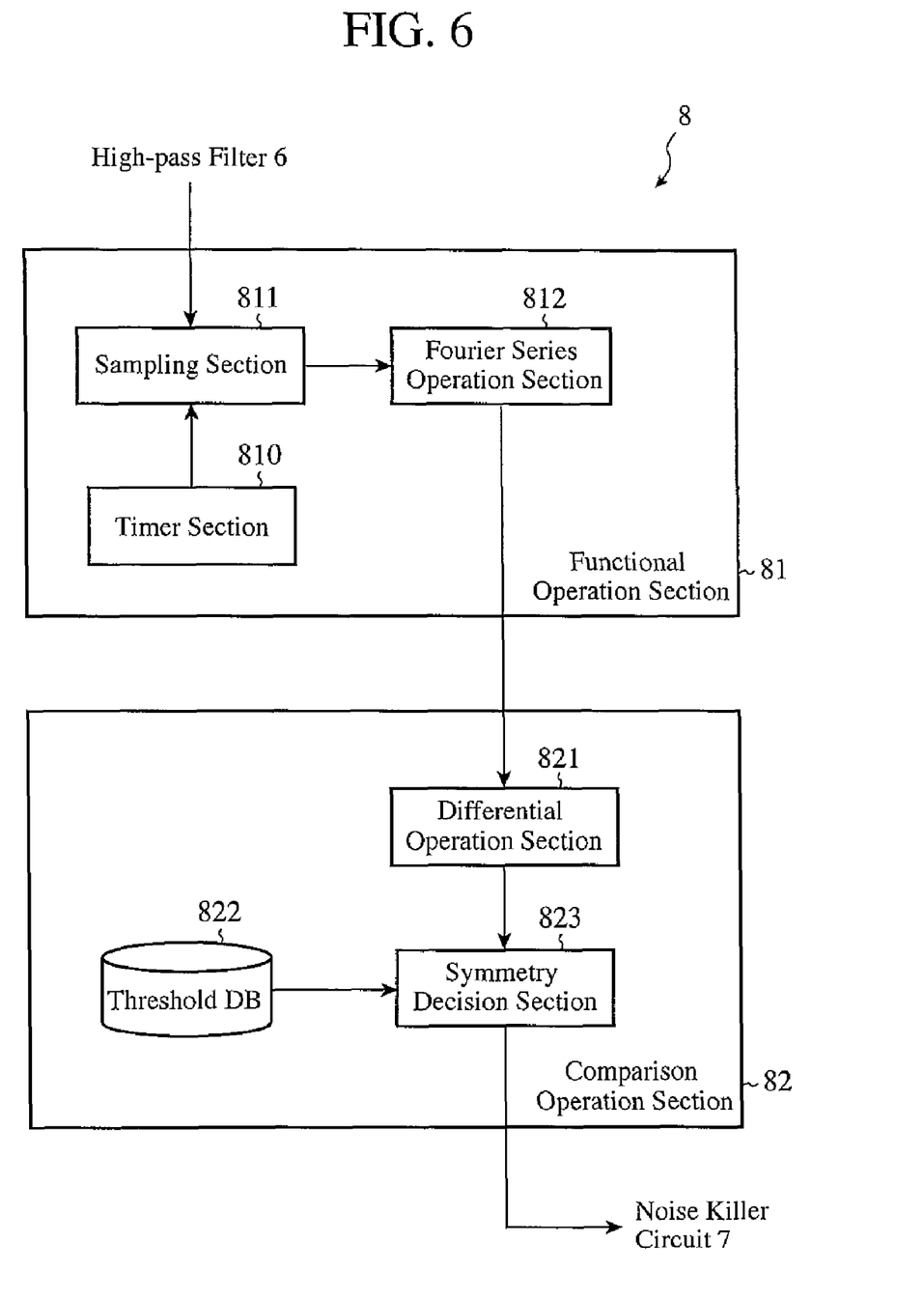
FIG. 6 is a block diagram showing an internal configuration of the control section shown in FIG. 5 with its functions being developed.

The control section 8 has a symmetric waveform detection function of detecting symmetry with respect to a particular reference value (threshold) of the pulse-like noise. To be concrete, it makes a decision from the Fourier spectrum distribution as to the waveform symmetry with respect to the particular threshold value of the pulse-like noise component, and limits the operation of the noise killer circuit 7 when a decision of the symmetric wave is made. Accordingly, as its internal configuration after undergoing the function expansion is shown in FIG. 6, the control section 8 comprises a functional operation section 81 and a comparison operation section 82.

The functional operation section 81 obtains the Fourier spectrum distribution by performing Fourier series operation of the pulse-like noise component at fixed time intervals. For this purpose, it comprises a timer section 810, a sampling section 811, and a Fourier series operation section 812.

More specifically, the sampling section 811 samples the pulse-like noise supplied from the high-pass filter 6 in accordance with the fixed time intervals (detection frame period) counted by the timer section 810, and supplies to the Fourier series operation section 812. The Fourier series operation section 812 calculates the amplitude distribution (Fourier spectrum) of the harmonics obtained by performing the Fourier series operation on the pulse-like noise component with the fixed time intervals, and supplies to the comparison operation section 82.

The comparison operation section 82 compares the reference value with the waveform obtained by differentiating the Fourier spectrum distribution calculated by the functional operation section 81, makes a decision as to the presence or absence of the symmetry from the comparison result, and limits the operation of the noise killer circuit 7. Thus, the comparison operation section 82 comprises a differential operation section 821, a threshold DB 822 and a symmetry decision section 823.

The differential operation section 821 calculates the differential coefficient with respect to the frequency axis of the Fourier spectrum distribution, which is obtained as a result of differentiating the relative amplitude of each frequency supplied from the functional operation section 81, and supplies as a first comparison target input to the symmetry decision section 823. As a second comparison target input, the symmetry decision section 823 is supplied with the reference value from the threshold DB 822, compares the two inputs (makes a threshold decision), and limits the operation of the noise killer circuit 7 when the value output from the differential operation section 821 is equal to or greater than the reference value, for example.

Returning the explanation to FIG. 5, the audio processor 9 performs the audio processing such as volume, tone control, and loudness on the audio signal output via the noise killer circuit 7, and outputs to the DA converter 10. The DA converter 10 converts the digital audio signal to an analog audio signal, which is amplified through the amplifier circuit 11 to the power capable of driving an externally connected speaker 12, and drives the speaker 12.

Figure 7:
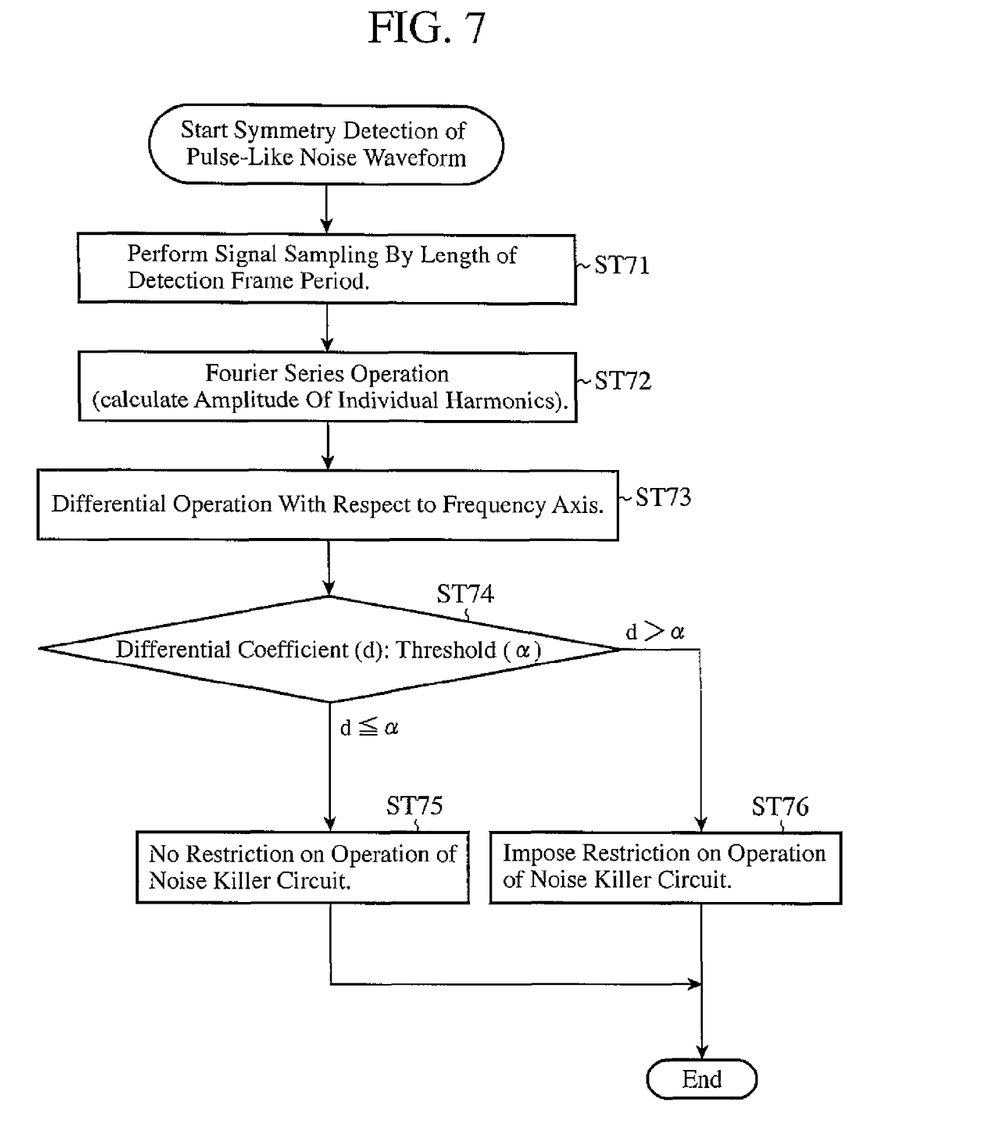
FIG. 7 is a flowchart showing the operation of the radio receiving apparatus of the embodiment 1 in accordance with the present invention.

FIG. 7 is a flowchart showing the operation of the radio receiving apparatus of the embodiment 1 in accordance with the present invention. FIG. 7 also shows individual processes (steps ST71-ST76) of the noise elimination method in the radio receiving apparatus in accordance with the present invention beginning from mixing of the pulse-like noise (burst noise) in the radio audio input signal and reaching the control of the noise killer circuit 7.

In the following, the operation of the radio receiving apparatus shown in FIG. 5 and FIG. 6 will be described in detail with reference to the flowchart of FIG. 7.

First, assume that the pulse-like noise having such high frequency components that can pass through the high-pass filter 6 is input to the control section 8. The control section 8 samples the input pulse-like noise with the sampling section 811 of the functional operation section 81 by the length of the detection frame period (step ST71), and the Fourier series operation section 812 carries out the Fourier series expansion in the detection frame period. Here, according to the Fourier series expansion, the relative amplitude values of the individual harmonics are calculated (step ST72).

Here, the function obtained by the Fourier series expansion is a function indicating the amplitude of the harmonics, and shows the Fourier spectrum distribution, as described with reference to FIG. 3.

The relative amplitude values of the individual harmonics output from the functional operation section 81 are supplied to the differential operation section 821 of the comparison operation section 82. The differential operation section 821 calculates a differential coefficient (d) with respect to the frequency axis of the Fourier spectrum distribution, and supplies to the symmetry decision section 823 as first operation input data (step ST73).

The symmetry decision section 823 compares, in a comparatively low frequency region, the differential coefficient (d) calculated by the differential operation section 821 with the reference value ("0", for example) stored in the threshold DB 822 (step ST74). If a decision is made that the differential coefficient is smaller than the reference value ("d≦α" at step ST74), the symmetry decision section 823 makes a decision that the input pulse-like noise has an asymmetric waveform, and does not restrict the operation of the noise killer circuit 7 (step ST75). More specifically, the noise killer circuit 7 recognizes that the noise mixes in the radio input audio, and carries out noise elimination by the previous value hold or interpolation processing.

On the other hand, if it makes a decision that the differential coefficient is greater than the reference value ("d>α" at step ST74), the symmetry decision section 823, making a decision that the original pulse-like noise has a symmetric waveform, restricts the operation of the noise killer circuit 7, or stops the operation (step ST76).

Incidentally, since the processing the noise killer circuit 7 carries out is processing of adjusting the original signal waveform and adding a signal waveform slightly different from the original, it can cause an uncomfortable aural feeling or new noise. Thus, in the case of the symmetric wave with small rasping harmonic components, it is desirable to stop the operation of the noise killer circuit 7 for the aural feeling. To stop the operation of the noise killer circuit 7, it is conceivable, for example, to provide a switch at its previous stage to bypass the output of the detector circuit 4 to the audio processor 9.

As described above, according to the radio receiving apparatus of the embodiment 1 in accordance with the present invention, the control section 8 can suitably control the operation of the noise elimination circuit, which has a probability of adding a signal waveform different from the original form, by detecting the symmetry with respect to the reference value of the input pulse-like noise waveform from its Fourier spectrum distribution, and by limiting, in the case of the symmetric wave, the operation of the noise elimination circuit such as the noise killer circuit 7, which carries out the previous value hold or various interpolation processing. Accordingly, it can obtain the audio signal desirable for the aural feeling.

Incidentally, as for the functions of the component blocks of the control section 8 shown in FIG. 5, they can be implemented by hardware in their entirety, or at least part of them can be implemented by software. For example, the operations of the functional operation section 81 and comparison operation section 82 can be achieved by hardware, respectively, or at least part of them can be achieved by a single or plural programs on a computer.

In addition, the noise elimination method in the radio receiving apparatus of the embodiment 1 in accordance with the present invention is a noise elimination method in the radio receiving apparatus having a noise elimination circuit (noise killer circuit 7) for removing the pulse-like noise component of the radio input audio signal by the previous value hold or interpolation processing in FIG. 5, for example, and has, in the flowchart of FIG. 7, for example, a step of sampling the pulse-like noise component of the radio input audio signal only by a length of a detection frame period (ST71); a step of calculating relative amplitude values of respective harmonics by performing Fourier series expansion of the pulse-like noise component with the length of the detection frame period (ST72); a step of calculating a differential coefficient with respect to a frequency axis from the relative amplitude values of the respective harmonics (ST73); and a step of comparing the calculated differential coefficient with the reference value in the comparatively low frequency region, of making, when a decision is made that the differential coefficient is smaller than the reference value, a decision that the pulse-like noise component has an asymmetric waveform, thereby enabling noise elimination operation by the noise elimination circuit, and of making, when a decision is made that the differential coefficient is greater than the reference value, a decision that the pulse-like noise has a symmetric waveform, thereby restricting or stopping the operation of the noise elimination circuit (ST74-ST76).

According to the noise elimination method in the radio receiving apparatus in accordance with the present invention, it can achieve appropriate control of the noise elimination circuit, which has a probability of generating a signal waveform different from the original form and adding it as noise, by restricting the operation of the noise elimination circuit depending on the radio input signal waveform.

INDUSTRIAL APPLICABILITY

As described above, the radio receiving apparatus in accordance with the present invention restricts, when the pulse-like noise component input at the time of receiving the radio audio signal is symmetric, the operation of the noise elimination circuit and obtains the audio signal desirable for the aural feeling. Accordingly, it is suitable for such applications as a radio receiving apparatus with a noise elimination circuit.

What is claimed is:

1. A radio receiving apparatus having a noise elimination circuit for removing a pulse-like noise component of a radio input audio signal, the radio receiving apparatus comprising:
   a control section for making a decision of waveform symmetry in amplitude positive and negative directions with respect to a center value in values input to said noise elimination circuit of the pulse-like noise component from Fourier spectrum distribution, and for stopping operation of the noise elimination circuit when a decision of a symmetric wave is made, the control section including
      a functional operation section for calculating coefficient distribution of harmonics by performing Fourier series expansion of the pulse-like noise component, wherein the Fourier series expansion has, as a basic period, time intervals which are equal to or longer than several tens times pulse width of the pulse-like noise component; and a comparison operation section for comparing a specific reference value with a differential coefficient obtained by frequency differentiating the coefficient distribution of the harmonics calculated by the functional operation section which have harmonic degree equal to or less than several tens degree of the Fourier series, and for controlling the noise elimination circuit by making a decision of the presence or absence of the waveform symmetry with respect to the center value in values input to said noise elimination circuit of the pulse-like noise component from the comparison result.

2. A noise elimination method in a radio receiving apparatus having a noise elimination circuit for removing a pulse-like noise component of a radio input audio signal, the noise elimination method in the radio receiving apparatus comprising:

a step of sampling the pulse-like noise component of the radio input audio signal only by a length of a detection frame period which is equal to or longer than several tens times pulse width of the pulse-like noise component;

a step of calculating relative amplitude values of respective harmonics by performing Fourier series expansion of the pulse-like noise component with the length of the detection frame period;

a step of calculating a differential coefficient with respect to a frequency axis from the relative amplitude values of the respective harmonics which have harmonic degree equal to or less than several tens degree of the Fourier series; and a step of comparing the calculated differential coefficient with a specific reference value, of making, when a decision is made that the differential coefficient is smaller than the specific reference value, a decision that the pulse-like noise component has an asymmetric waveform with respect to a center value in values input to said noise elimination circuit, thereby enabling noise elimination operation by the noise elimination circuit, and of making, when a decision is made that the differential coefficient is greater than the specific reference value, a decision that the pulse-like noise has a symmetric waveform with respect to a center value in values input to said noise elimination circuit, thereby stopping the operation of the noise elimination circuit.

3. A radio receiving apparatus comprising:

a noise elimination circuit that removes a pulse-like noise component of a radio input audio signal; and a controller that makes a decision of symmetry of the pulse-like noise component by evaluating amplitude of the pulse-like noise component in both positive and negative directions with respect to a center value determined from values of a Fourier spectrum distribution of the pulse-like noise component, said values being input to said noise elimination circuit, and stops operation of the noise elimination circuit in response to a decision that the pulse-like noise component is symmetrical, the controller including:

a functional operator that calculates coefficient distribution of harmonics by performing Fourier series expansion of the pulse-like noise component, wherein the Fourier series expansion has, as a basic period, time intervals which are equal to or longer than several tens times pulse width of the pulse-like noise component; and a comparison operator that compares a specific reference value with a differential coefficient obtained by frequency differentiating the coefficient distribution of the harmonics calculated by the functional operator which have harmonic degree equal to or less than several tens degree of the Fourier series, and controls the noise elimination circuit by making said decision of symmetry of the pulse-like noise component from the comparison result.

4. A non-transitory computer-readable medium having embodied thereon instructions which, when executed by a computer, cause the computer to perform a noise elimination method in a radio receiving apparatus having a noise elimination circuit for removing a pulse-like noise component of a radio input audio signal, the noise elimination method in the radio receiving apparatus comprising:

a step of sampling the pulse-like noise component of the radio input audio signal only by a length of a detection frame period which is equal to or longer than several tens times pulse width of the pulse-like noise component;

a step of calculating relative amplitude values of respective harmonics by performing Fourier series expansion of the pulse-like noise component with the length of the detection frame period;

a step of calculating a differential coefficient with respect to a frequency axis from the relative amplitude values of the respective harmonics which have harmonic degree equal to or less than several tens degree of the Fourier series; and a step of comparing the calculated differential coefficient with a specific reference value, of making, when a decision is made that the differential coefficient is smaller than the specific reference value, a decision that the pulse-like noise component has an asymmetric waveform with respect to a center value in values input to said noise elimination circuit, thereby enabling noise elimination operation by the noise elimination circuit, and of making, when a decision is made that the differential coefficient is greater than the specific reference value, a decision that the pulse-like noise has a symmetric waveform with respect to a center value in values input to said noise elimination circuit, thereby stopping the operation of the noise elimination circuit.

* * * * *